Jan. 27, 1942.  C. L. JOHNSON  2,271,226
AIRPLANE
Filed Oct. 31, 1938   2 Sheets-Sheet 1

INVENTOR
Clarence L. Johnson

Jan. 27, 1942.    C. L. JOHNSON    2,271,226
AIRPLANE
Filed Oct. 31, 1938    2 Sheets-Sheet 2
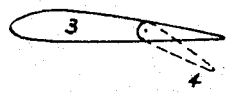
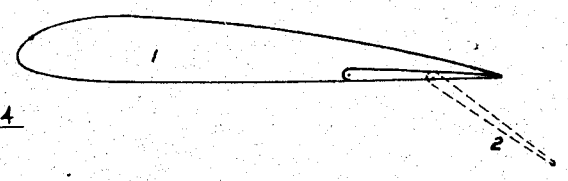
FIGS. 4
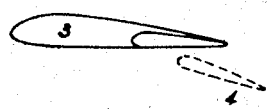
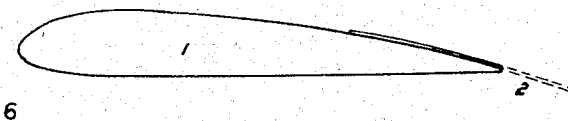
FIGS. 5
FIGS. 6
FIGS. 7
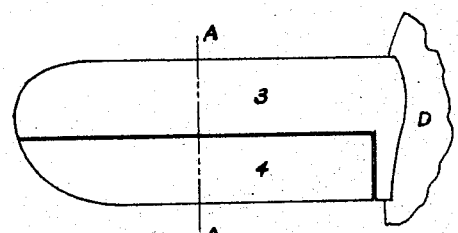
FIGS. 8
FIGS. 8A
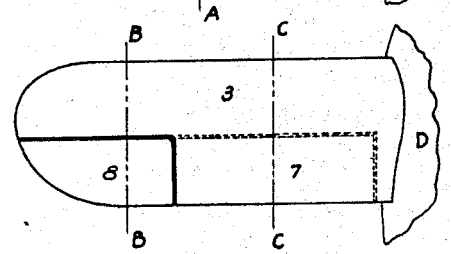
FIGS. 9
FIGS. 9B
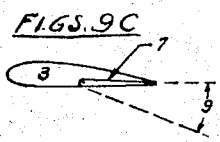
FIGS. 9C
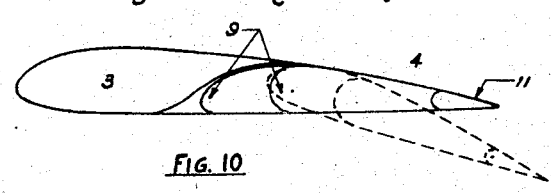
FIG. 10
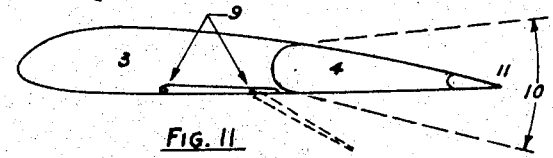
FIG. 11
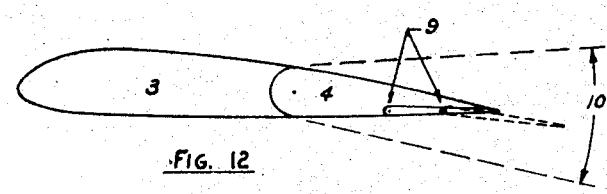
FIG. 12
INVENTOR
Clarence L. Johnson Patented Jan. 27, 1942

2,271,226

UNITED STATES PATENT OFFICE 2,271,226

AIRPLANE

Clarence L. Johnson, Burbank, Calif., assignor to Lockheed Aircraft Corporation, Burbank, Calif.

Application October 31, 1938, Serial No. 237,896

15 Claims. (Cl. 244—45)

The present invention relates to improvements in aircraft designs, and in particular to heavier-than-air aircraft, flying machines, airplane, flying-boat, amphibian and glider constructions, by which it is possible to combine a very efficient means of longitudinal flight stability with an airplane design which is very efficient from all aerodynamic standpoints. The term "airplane" will be used throughout these specifications to include broadly all types of aircraft.

In the conventional airplane the horizontal tail surfaces which usually occur at the tail of the airplane, do not carry any substantial portion of the lift of the airplane, in fact, in certain flight maneuvers this horizontal surface carries a negative lift load. This is disadvantageous as this negative lift load increases instead of decreases the total wing loading. It has been shown that it is possible to build and design airplanes of either the monoplane or bi-plane type with a smaller wing positioned in front of the main wing or wings. The prior art shows this front wing to be pivotally attached to the fuselage or body member in such a way that the complete front wing may be rotated about its horizontal spanwise axis. It has also been shown that under this construction the center of gravity of the airplane may be then positioned between the two mentioned wings, i. e., between the aerodynamic centers of the wings, in which case both wings are used as lifting surfaces. The art suggests and requires the pivoting of the total front surface only, such pivoting action taking care of the longitudinal stability of the airplane. The patented art also shows that as the front wing is pivoted, a certain increase in lift coefficient is obtained, however, I have found that such increase is not so large as can be obtained by other devices installed in connection with the front wing. This invention relates to such devices, in combination with other novel features hereinafter described.

The prior art shows the main wing to consist of the wing structure and the usual ailerons. I have found that such an airplane construction as described hereinabove has considerably greater over-all aerodynamic efficiency when the main wing of the airplane contains some type of a flap or other high lift device, in which case the center of pressure of the wing moves rearward thereby causing a diving moment on the airplane, such diving moment being counteracted by the highly efficient lifting front wing. I have found that this front wing, in order to produce a high lift necessary to counteract this diving moment, should contain some type of high lift device such as elevators, flaps, slots, or other controllable elements including devices for controlling the boundary layer. For convenience of terminology, the term "flap" will be used throughout these specifications and claims to include broadly all high lift devices.

The common pivotally mounted control surface as shown by the prior art which is located in the fore part of the airplane is sufficient only when there is a small center of pressure movement, however, it is insufficient when the main wing carries the desirable flap with its inherent change in location of the center of pressure, with its corresponding increase in diving moment. Therefore, it is obvious that by the use of flaps an essentially different effect is encountered over that which is found in the prior art. This effect is best overcome by the teachings of this invention.

There have also been airplanes designed with a forward wing which has been pivoted about the horizontal longitudinal axis of the airplane but this construction has not proved very satisfactory. Other constructions may be cited to show that the possibility of obtaining longitudinal steering in the horizontal plane by means of a pivotally mounted control surface located in the fore part of the airplane is quite common in early days of flying.

This invention relates to a great improvement over the prior art and publication and also present aeronautical design and construction.

As the primary object of this present invention, I claim to have invented an airplane construction which is inherently stable under a comparatively large range of load conditions.

A second object of this invention is to provide an aerodynamically efficient construction in which the main wing and the forward wing both carry lifting loads.

A further object of my invention is to provide an airplane construction which uses auxiliary devices in connection with the main and forward wing to produce exceptional performance both in normal flying maneuvers and in landing maneuvers. A still further object of this invention is to provide an airplane construction which allows for a large range of center of gravity travel, without sacrificing the ease of maneuverability.

A further object of this invention is to provide an airplane construction with means by which the landing speed may be substantially decreased to provide for a safer landing condition. A still further object of this invention is to provide an airplane construction which permits a higher cruising speed due to decreased weight and decreased wing area which is made possible by the use of the devices as specified herein.

A further object of this invention is to provide for an airplane which becomes more stable longitudinally with free controls rather than less stable as on conventional airplanes. A still further object of this invention is to provide an airplane construction which is very difficult to stall in any maneuver, thereby eliminating one of the most common dangers in airplane flight. Another object of this invention is to provide an airplane construction in which the near-ground maneuverability is increased in that the rate of climb without fear of stalling is increased, thus making it possible to clear objects readily.

A further object of this invention is to provide an airplane construction in which the wing area is decreased materially without loss in lifting power or safety in operation, thus being advantageous in making construction expense a minimum and providing for simplicity of operation and construction, as well as an increase in performance.

A further object is to provide an airplane design which is free of the usual detrimental effects of main wing downwash on the conventional horizontal control surfaces. A still further advantage is that the longitudinal stability is practically unaffected by the propeller slipstream.

There are many other objects and advantages of this airplane construction which will become apparent to those skilled in the art, upon reading of the following specification and claims. It is to be understood that the full scope and spirit of the invention is to be enjoyed herein and that I am not limited to the specification and drawings as shown in the accompanying application.

In the drawings:

Figure 1 is a side view of an airplane which design includes the invention as described herein. Figure 2 is a plan view of the airplane showing the invention applied to this construction. Both figures portray the invention as designed on a present day highly efficient and highly performing airplane.

Figure 3 illustrates the basic principle and/or basic features of the invention which is claimed herein.

Figures 4, 5, 6 and 7 illustrate various combinations of high lift devices as featured by this invention. It is to be understood that the devices shown are only a few of the many devices which are applicable to these teachings and that in these figures the devices may be interchanged one with another to form various combinations, all of which show the intent of the teachings of this invention. The mechanisms necessary to extend and retract these high lift devices are obviously old in the art, and, therefore, not necessary to explain.

Figure 8 shows a plan view and section of the forward wing.

Figure 9 also shows a plan view and two sections of the forward wing.

Figs. 8A, 9B and 9C are views taken respectively on lines A—A; B—B; and C—C of Figs. 8 and 9.

Figures 10, 11 and 12 illustrate by enlarged sections the preferred designs of the forward wing.

Figure 1:
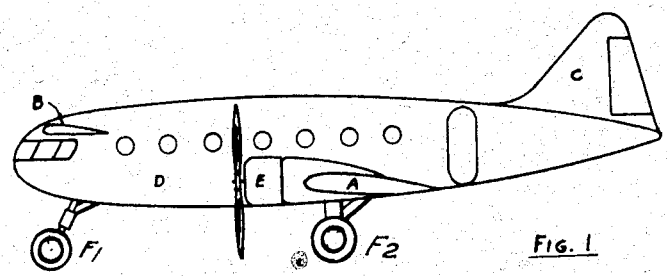
Figure 2:
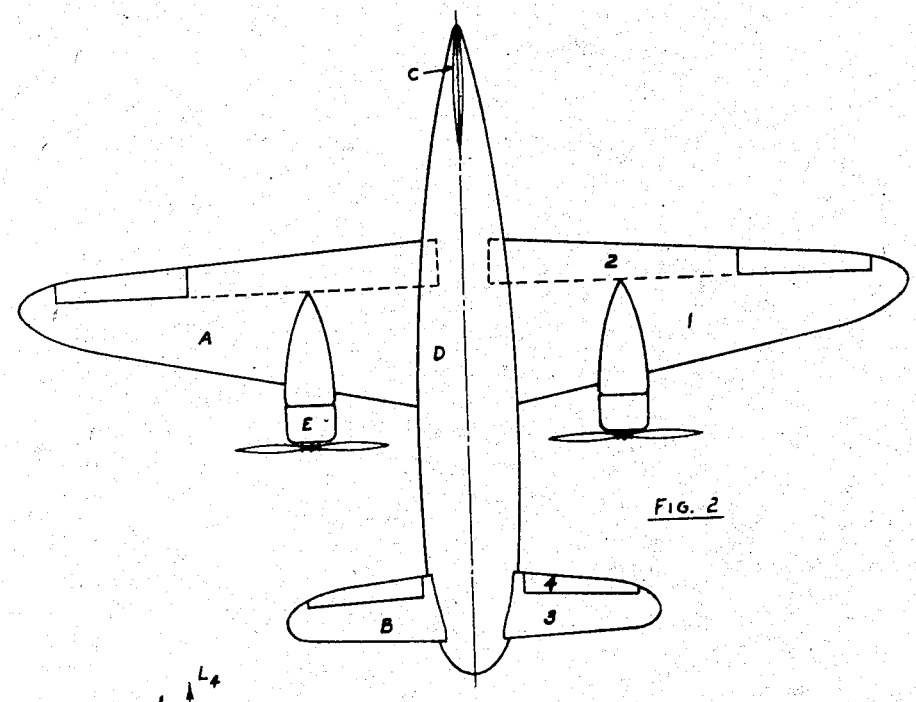

First, referring in particular to Figures 1 and 2 of the drawings, A is the main wing of the airplane, B is the forward wing of the airplane, C the vertical control surfaces, D the body or fuselage, E the engines or propelling mechanism, and $F_1$ and $F_2$ the wheels of a suitable landing gear.

In all of these disclosures it is evident that the main wing A consists of the wing structure 1 and, in addition, some type of wing flap or other high lift device 2. The said flap 2 may or may not be designed for the full span of the wing. In referring to a main wing or a main wing unit, it is to be understood that such reference is interchangeable and includes broadly any type or design of wing or wing unit including those which occur in monoplanes, bi-planes, and so forth. The forward wing B consists of a main fixed structure 3 and, in addition, some type of controllable surface 4 attached thereto which may be adjusted by the pilot for the necessary longitudinal stability and control. The drawings show a customary typical surface C attached in the conventional manner at the tail of the airplane, said surface being designed to control the yawing moment required for flight maneuvering. It is to be understood that surface C is not a necessary part of this invention and, if used, may be placed in various positions on the airplane. It is possible that this surface may not be required, for it may be that sufficient yawing moment can be obtained from aileron action.

Further, it is to be understood that the relative positioning of the elements A, B and C with respect to one another and with respect to the fuselage or body D is not essential to the invention as claimed herein, with the exception that the wing B is forward of the main wing A. Such elements may be designed in various positions and locations. Likewise, the engines E and the landing wheels $F_1$ and $F_2$ may be varied in location. The landing wheels are preferably connected to the body by means of suitable struts as illustrated in Figure 1 to form a so-called tricycle type of landing gear arrangement in which the rear wheels are normally directionally fixed and the forward wheel normally of a freely castering or stearable type. The center of gravity of the airplane is located intermediate the forward wheel $F_1$ and the rear main wheels $F_2$ as is apparent by reference to Figures 1 and 3.

Figure 3:
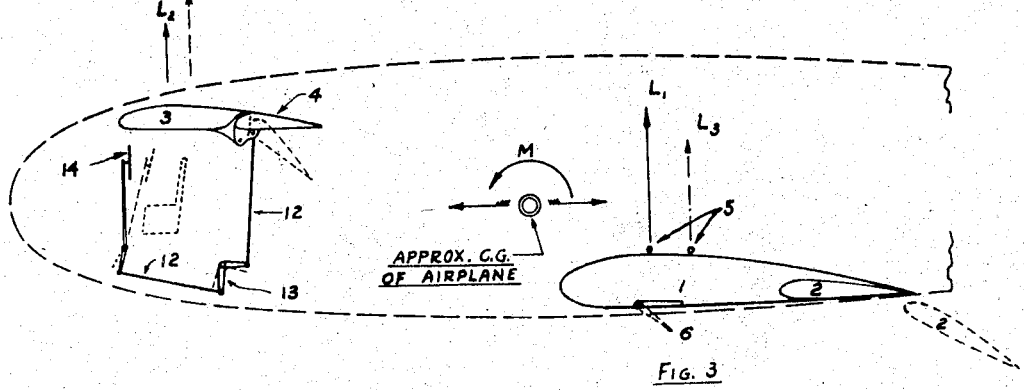

Figure 3 illustrates the basic feature of this invention, that is, the relative loading of the main wing A and the forward wing B, such loading being determined in part by the loading of the airplane and the position of the control surfaces and high lift devices. The forward wing B, when operating in conjunction with the high lift wing A, caused by the wing flap combination or other high lift means, acts very efficiently in that when the flap 2 on the main wing A is extended or lowered, the center of pressure 5 of the wing moves to the rear, thus causing a diving moment M on the airplane. With the combination as described herein, this diving moment M is counteracted by a lifting force on the front surface 8, such lifting force decreasing the total load to be carried by the main wing, such being a radical improvement over conventional airplanes. It is to be understood that in case of excessive diving moment, that a moment control flap 6, or its equivalent, may be installed on the wing A, such a flap when extended causes a building up of pressure on the lower surface and near the leading edge of the wing, in such a manner as to have a counteracting effect on the diving moment. The total lift on the airplane equals L equals $L_1$ plus $L_2$ equals $L_3$ plus $L_4$, wherein $L_1$ and $L_2$ represent the lift vectors during normal level flight (the relative ratio of lift being shown by the length of the lines) and $L_3$ and $L_4$ represent the lift vectors during landing maneuvers. Obviously, these ratios are determined by the loading of the airplane, i. e., the position of the lift-drag resultant of the two wing surfaces with respect to the location of the center of gravity in such a manner that the moments about the center of gravity are neutralized.

Figures 8 and 9 illustrate by plan views and sections, various constructions of the forward wing B. Figure 8 shows the movable portion 4 to be substantially spanwise. Also, Figure 9 shows the movable portion 4 to be substantially spanwise, however, it is divided into a flap section 7 and an elevator section 8. Figures 8 and 9 illustrate the many possibilities of construction.

Figures 10, 11 and 12 illustrate by enlarged sections various constructions of the forward wing B, consisting of the fixed portion 3 and the movable portion 4, in which a flap action 9 and also an elevator action 10 may be obtained. The trim of the airplane can be secured by the trailing edge tabs 11.

It is obvious that the flap 2 of the main wing and the movable portion 4 of the forward wing may be interconnected in order to obtain automatic trim as the surfaces extend.

The flaps on the main wing A may be extended or retracted by any customary method as known by the prior art and present-day designers. The movable portion of the forward wing B can also be adjusted by these known methods. Figure 3 shows one of the simplest methods, that is the linkage 12 and the bellcrank 13 attached to the control wheel 14, whereupon any movement in a fore and aft direction of the wheel 14 moves or adjusts the movable portion 4 of the wing B.

It may be advantageous to add a small horizontal stabilizer, and/or elevator, and/or flap, at the tail of the airplane near surface C, this being an advantage in obtaining better aerodynamic stability. It is to be understood that on one airplane design it may not be necessary, however, on the second airplane design such might be necessary. The ratios of the areas of the two surfaces may be determined by wind tunnel tests in order to produce satisfactory stability regardless of the position of the flap with respect to the wing. In this case the rearward stabilizer acts more than merely a control surface, it also has the advantage of acting as end plates for the vertical surface.

The combinations as described and illustrated are merely a few of the possible ones, however, it is believed that such are sufficient to show the many and varied possibilities of this invention. It is to be understood that various other combinations, changes, variations, substitutions, additions, and eliminations might be used without departure from the spirit and scope of the invention, and hence it is not desired to limit the invention in all respects to the exact and specific disclosures hereof.

I claim:

1. In an airplane structure the combination of members comprising a body, a main wing rigidly attached to said body, means to vary the maximum coefficient of lift of said main wing whereby the effective center of lift is moved rearward, a forward wing rigidly fixed to said body at a point ahead of said main wing, said forward wing having an area substantially less than said main wing, and including a first means to vary the maximum effective coefficient of lift of said forward wing and a second pilot operable means to control the longitudinal stability of the airplane, and means associated with said main wing for effecting lateral control of said airplane structure.

2. In an airplane structure the combination of members comprising a body, a main wing rigidly attached to said body, means associated with said main wing to increase the amount of effective lift and to move the effective center of lift of said wing rearward, a forward wing rigidly fixed to said body at a point ahead of said main wing, said forward wing having an area substantially less than said main wing and comprising a fixed portion and an extendable portion to increase the maximum effective coefficient of lift of said forward wing, said extendable portion having a movable flap for longitudinal control, and means associated with said main wing for effecting lateral control of said airplane structure.

3. In an airplane the combination of members comprising a body, a main wing rigidly attached to said body, directionally fixed main supporting wheels to the rear of the center of gravity of the airplane and a supporting wheel forward of the center of gravity of the airplane, means to increase the effective lift coefficient of said main wing whereby the effective center of lift is moved rearward, a second wing fixed to said body forward of said main wing, means to increase the maximum effective lift coefficient of said forward wing whereby the moments caused by the lift on said wings are balanced about the center of gravity of the airplane, said lift coefficient varying means of said main and forward wings acting to substantially reduce the loading on the supporting wheels during ground maneuvers.

4. In an airplane the combination of members comprising a body, a main wing rigidly attached to said body, directionally fixed main supporting wheels to the rear of the center of gravity of the airplane and a supporting wheel forward of the center of gravity of the airplane, means to increase the amount of lift and to move the effective center of lift of said main wing rearward, a second wing fixed to said body forward of said main wing having an area substantially less than said main wing, and means to increase the maximum effective lift coefficient of said forward wing whereby the loading on the supporting wheels is substantially reduced during ground maneuvers.

5. In an airplane the combination of members comprising a body, a main wing rigidly attached to said body, directionally fixed main supporting wheels to the rear of the center of gravity of the airplane and a supporting wheel forward of the center of gravity of the airplane, a flap mounted on said main wing to vary the amount of lift and to move the center of lift of said main wing rearward, a second wing forward of said main wing comprising a fixed portion and an adjustable trailing portion, means providing for the location of the center of gravity between said main wing and said forward wing, and pilot-operable means interconnected with said adjustable trailing portion to control longitudinal stability of the airplane by balancing the moments caused by the lift on said wings about the center of gravity of the airplane.

6. In an airplane, in combination, a body, a main wing rigidly attached to said body, a landing gear for the airplane embodying landing wheels spaced forward of and to the rear of the airplane center of gravity, a flap mounted on said main wing for movement to positions increasing the lift coefficient of said main wing whereby the effective center of lift is moved rearward, a second wing fixed to said body forward of said main wing including a trimming means for increasing the effective lift of said forward wing whereby the lift moments of said wings are balanced about the center of gravity of the airplane, and pilot actuated mechanism for controlling said trimming means whereby the lift of said wings can be increased to substantially reduce the loading on said landing wheels during the take-off run.

7. In an airplane, in combination, a body, a main wing rigidly attached to said body, a landing gear for the airplane embodying landing wheels spaced forward of and to the rear of the airplane center of gravity, a flap mounted on said main wing for movement to positions increasing the lift coefficient of said main wing whereby the effective center of lift is moved rearward, a second wing fixed to said body forward of said main wing including a trimming means for increasing the effective lift of said forward wing, and pilot actuated mechanism for controlling said trimming means whereby the lift of said wings can be increased for the take-off run without changing the normal horizontal attitude of the airplane body or the normal angle of incidence of the fixed portions of said wings.

8. In an airplane structure the combination of members comprising a body, a main wing rigidly attached to said body, means to increase the maximum effective coefficient of lift of said main wing and to move the effective center of lift rearward, a forward wing rigidly fixed to said body at a point ahead of said main wing, means to increase the maximum effective coefficient of lift of said forward wing, and means associated with said main wing for effecting lateral control of said airplane structure.

9. In an airplane structure the combination of members comprising a body, a main wing rigidly attached to said body, means to vary the maximum effective coefficient of lift of said main wing whereby the center of pressure coefficient of said main wing is also varied, means associated with said main wing to compensate for the variation of the center of pressure coefficient of said main wing, a forward wing rigidly fixed to said body at a point ahead of said main wing, said forward wing having an area substantially less than said main wing, and means to vary the lift of said forward wing to effect longitudinal control of said airplane structure.

10. In an airplane structure the combination of members comprising a body, a main wing rigidly attached to said body, means to increase the maximum effective coefficient of lift of said main wing and to move the effective center of lift rearward, said means comprising a flap separable from the trailing edge portion of said main wing, a forward wing attached to said body at a point ahead of said main wing, said forward wing having an area substantially less than said main wing, and means to increase the maximum effective coefficient of lift of said forward wing.

11. In an airplane structure the combination of members in accordance with claim 10 in which the said flap is rearwardly extendable from the trailing edge portion of said main wing.

12. In an airplane structure the combination of members in accordance with claim 10 in which the means to increase the maximum effective coefficient of lift of said forward wing comprises a flap separable from the trailing edge portion of said wing.

13. In an airplane structure the combination of members in accordance with claim 10 in which the means to increase the maximum effective coefficient of lift of said main wing and said forward wing comprise flaps rearwardly extendable from said wings.

14. In an airplane structure the combination of members in accordance with claim 4 in which the means to increase the amount of lift comprises a flap separable from the trailing edge portion of said main wing.

15. In an airplane structure the combination of members in accordance with claim 5 in which the said flap is separable from the trailing edge portion of said main wing.

CLARENCE L. JOHNSON.